US012083370B2

(12) United States Patent
Oh

(10) Patent No.: US 12,083,370 B2
(45) Date of Patent: Sep. 10, 2024

(54) FLEXIBLE HOSE IDENTIFICATION SLEEVE FOR SPRINKLER

(71) Applicant: Kofulso Co., Ltd., Incheon-si (KR)

(72) Inventor: Seung-il Oh, Seoul (KR)

(73) Assignee: KOFULSO CO., LTD, Seoul (KR)

(*) Notice: Subject to any disclaimer, the term of this patent is extended or adjusted under 35 U.S.C. 154(b) by 127 days.

(21) Appl. No.: 18/069,433

(22) Filed: Dec. 21, 2022

(65) Prior Publication Data

US 2024/0131375 A1 Apr. 25, 2024
US 2024/0226626 A9 Jul. 11, 2024

(30) Foreign Application Priority Data

Oct. 25, 2022 (KR) ........................ 10-2022-0137946

(51) Int. Cl.
*G09F 3/02* (2006.01)
*A62C 35/68* (2006.01)
*G09F 3/00* (2006.01)

(52) U.S. Cl.
CPC ............ *A62C 35/68* (2013.01); *G09F 3/0295* (2013.01)

(58) Field of Classification Search
CPC ............................... A62C 35/68; G09F 3/0295
See application file for complete search history.

(56) References Cited

U.S. PATENT DOCUMENTS 2,768,457 A * 10/1956 Biek ........................ G09F 3/185 40/660
3,979,095 A 9/1976 Schlotz
3,979,096 A 9/1976 Zieger
4,246,712 A 1/1981 Vander Wall
4,268,986 A * 5/1981 Piana .................. C07D 231/16 40/661
4,405,085 A 9/1983 Meyer
4,612,718 A 9/1986 Golub et al.
4,844,000 A 7/1989 Clement
4,951,596 A * 8/1990 Wallace, Jr. .............. G09F 3/16 116/323
5,020,730 A 6/1991 Perroud et al.
5,138,784 A 8/1992 Niwa
5,275,282 A * 1/1994 Ross ......................... G09F 3/16 40/309
5,623,890 A 4/1997 Lenseke
D388,833 S * 1/1998 Wilson ........................... D20/42
5,782,581 A * 7/1998 DeCanio ................... G09F 3/04 405/186
6,079,135 A 6/2000 Ruiz
6,126,119 A 10/2000 Giangrasso
6,420,657 B1 * 7/2002 Fang ..................... G09F 3/0295 174/112
6,651,362 B2 * 11/2003 Caveney ................... G09F 3/20 40/638

(Continued)

*Primary Examiner* — Gary C Hoge
(74) *Attorney, Agent, or Firm* — Jacobson Holman PLLC

(57) ABSTRACT

Disclosed herein is a flexible hose identification sleeve for a sprinkler, which can be bent and hung regardless of the position of a main pipe or other supporting members. The flexible hose identification sleeve for a sprinkler includes: a sleeve member having a hole formed in one side and an opening formed on the outer face thereof and fitted around the outer diameter of a flexible hose; and a hanging device connected to the hole of the sleeve member for hanging the flexible hose which can be bent.

8 Claims, 5 Drawing Sheets

(56) References Cited

U.S. PATENT DOCUMENTS

| | | | | |
|---|---|---|---|---|
| 6,942,735 | B2 | 9/2005 | Rich | |
| 7,017,868 | B2 | 3/2006 | Kirschner | |
| 7,194,829 | B2 * | 3/2007 | Boire | G09F 3/205 40/666 |
| 7,373,720 | B1 * | 5/2008 | Jensen | A62C 35/68 169/41 |
| 7,427,051 | B2 | 9/2008 | Oh | |
| 7,464,905 | B2 | 12/2008 | Wang | |
| 7,780,123 | B1 | 8/2010 | Bailyn et al. | |
| 7,878,464 | B2 | 2/2011 | Oh | |
| 8,573,544 | B2 | 11/2013 | Shelton | |
| D724,187 | S | 3/2015 | Savage et al. | |
| 2005/0171492 | A1 * | 8/2005 | Rodriquez | A61M 39/08 604/264 |
| 2014/0231103 | A1 * | 8/2014 | Savage | F16L 11/124 29/428 |
| 2016/0023028 | A1 * | 1/2016 | Jung | F16M 13/027 248/316.2 |
| 2017/0197101 | A1 * | 7/2017 | Chong | B05B 15/63 |
| 2018/0100607 | A1 * | 4/2018 | Dafonseca | A62C 35/68 |
| 2021/0001162 | A1 * | 1/2021 | Oakes | A62C 37/11 |

* cited by examiner

FLEXIBLE HOSE IDENTIFICATION SLEEVE FOR SPRINKLER

BACKGROUND OF THE INVENTION

Field of the Invention

The present invention relates to a flexible hose identification sleeve for a sprinkler having a hanger function, more specifically, to a flexible hose identification sleeve for a sprinkler that allows the flexible hose, of which one end is connected and mounted to a main pipe, to be bent and hung so as not to interfere with work.

Background Art

In general, a plurality of support members for constructing a main pipe for firefighting and various types of facilities are installed horizontally and vertically on the ceiling.

Construction work is performed in order of connecting one end of a flexible hose to a main pipe for firefighting, installing various facilities, bending the flexible hose, locating the bent flexible hose at a desired place, and connecting a sprinkler to the other end of the flexible hose.

Since the constructed flexible hose is long, in a case in which the flexible hose of which one end is connected to the main pipe hangs loosely, it hinders installation work of other facilities. Accordingly, it is necessary to do additional work of bending the flexible hose and hanging the bent flexible hose on the main pipe or the support member.

However, the additional work has several disadvantages in that there is a limitation in position of the main pipe or the support member, and in that the flexible hose may act as an obstruction to the installation work of other facilities because the hanging position of the flexible hose is limited.

In addition, since the conventional flexible hose has no means to hang the flexible hose, a worker must arbitrarily use a string in a workshop, but it reduces work efficiency.

Recently, a flexible hose identification sleeve as disclosed in U.S. Design Pat. No. 724,187 has been proposed. In U.S. Design Pat. No. 724,187, the identification sleeve displays various information, such as a manufacturer, and a type and a direction of a fluid as well as whether the flexible hose is a certified product suitable for firefighting.

The conventional flexible hose identification sleeve does not have a means for hanging the flexible hose regardless of the position of the main pipe or the supporting member.

SUMMARY OF THE INVENTION

Accordingly, the present invention has been made to solve the above-mentioned problems occurring in the prior art, and it is an object of the present invention to provide a flexible hose identification sleeve for a sprinkler, which can be bent and hung regardless of a position of a main pipe or other supporting members.

To accomplish the above object, according to the present invention, there is provided a flexible hose identification sleeve for a sprinkler including: a sleeve member having a hole formed in one side and an opening formed on the outer face thereof and fitted to the outer diameter of a flexible hose; and hanging means connected to the hole of the sleeve member for hanging the bent flexible hose.

The flexible hose identification sleeve for a sprinkler according to the present invention can allow a worker to effectively hang the flexible hose by using the sleeve member and the hanging means regardless of positions of the main pipe or other support members in the state in which the flexible hose of which one end is connected to the main pipe is bent in the middle not to interfere with other work, thereby serving as a hanger.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
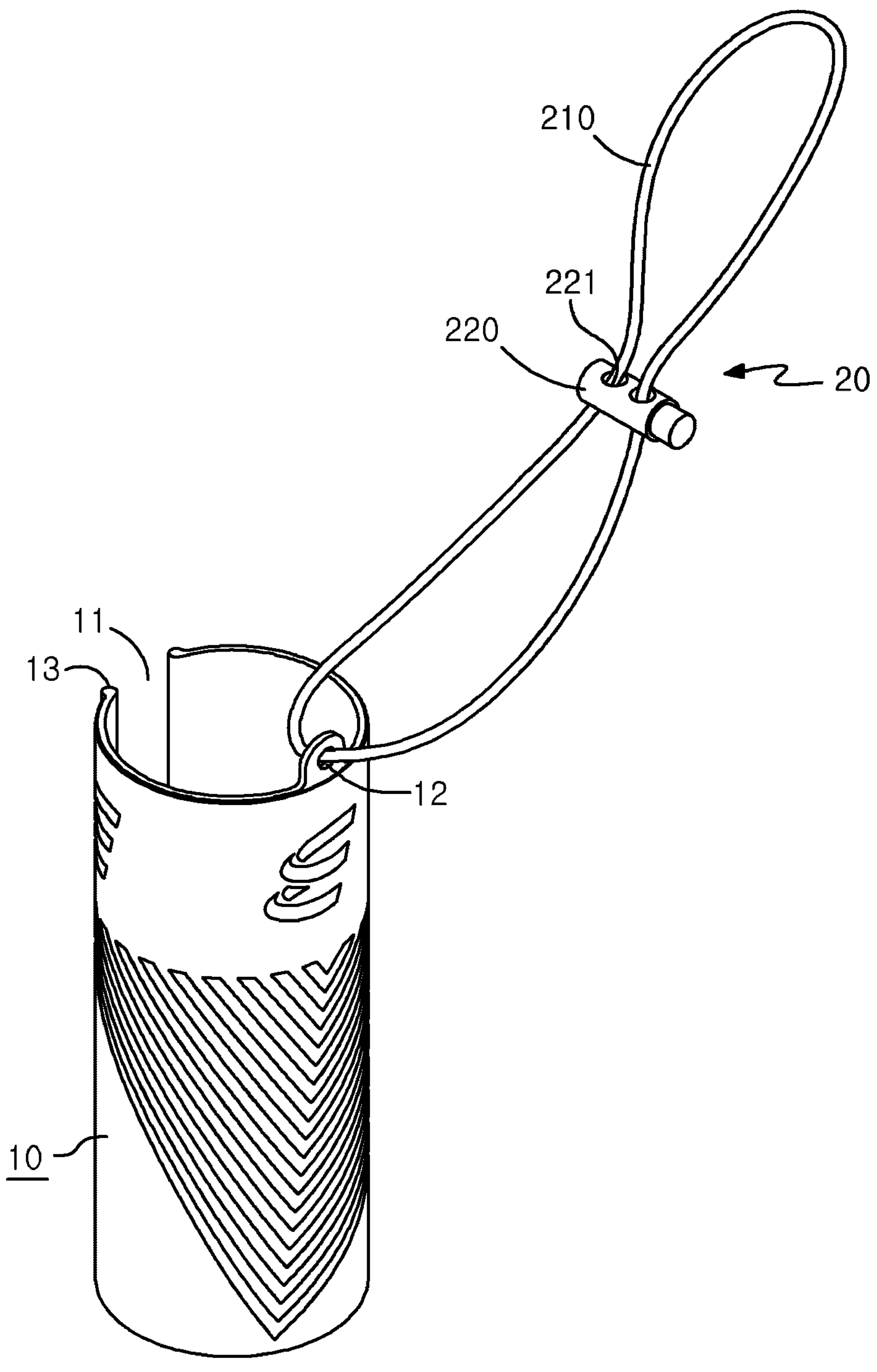
FIG. 1 is a perspective view illustrating a flexible hose identification sleeve for a sprinkler according to an embodiment of the present invention.

With reference to the accompanying drawings, detailed contents for carrying out the present invention will be described as follows.

As illustrated in FIGS. 1 to 5, a flexible hose identification sleeve for a sprinkler according to an embodiment of the present invention includes: a sleeve member 10 having a hole 12 formed in one side and an opening 11 formed on the outer face thereof and fitted to the outer diameter of a flexible hose 30; and hanging means 20 connected to the hole 12 of the sleeve member 10 for hanging the bent flexible hose 30.

The sleeve member 10 may be made of a metal or synthetic resin material capable of providing an elastic force that can widen the opening 11 of the sleeve member 10 to be inserted onto the flexible hose 30 and return the opening 11 to its original state after being inserted onto the flexible hose 30. Various types of information related to the flexible hose 30, such as a certified state, a manufacturer, a type of fluid, a direction, and the like, may be displayed on the outer circumferential surface of the sleeve member 10.

It is preferable to form bent portions 13 on both sides of the opening 11 so as to be fit onto the flexible hose 30.

FIG. 5A illustrates the hanging means 20 according to a first embodiment of the present invention. As illustrated in FIG. 5A, the hanging means 20 may be a string 210 of which one end is tied to the hole 12 and the other end may be tied to the bent flexible hose 30.

FIG. 5B illustrates an example in which the other end of the string 210 is tied to form a ring 211 to which the flexible hose 30 is fit into.

FIG. 5C illustrates another example in which a hanging member 212 for hanging the flexible hose 30 is connected to the other end of the string 210.

FIG. 5D illustrates a second embodiment of the present invention in which a string 210 of the hanging means 20 is formed into a closed loop shape passing through the hole 12.

FIG. 5E illustrates a hanging means 20 including a tightening member 220 having two through holes 221 through which the string 210 of FIG. 5D passes. The string 210 tightens the flexible hose 30 by using the tightening member 220.

FIG. 5F illustrates an example in which the string 210 of FIG. 5C is connected in a closed loop shape by a connection member 230 having a detachable portion 231. The detachable portion 231 may be a space to take out the string 210 tied to the connection member 230, or a member to open and close the connection member.

The hanging means 20 is to be connected to the sleeve member 10 to hold the flexible hose 30, and is not limited by the embodiments or examples of FIGS. 5A to 5F.

It is preferable that the string 210 is made of an elastic material, such as a rubber band.

The flexible hose 30 includes a nipple 31 disposed on one end thereof to be connected to the main pipe 40, and a reducer 32 disposed on the other end thereof to be connected to the sprinkler 50.

In a state in which the hanging means 20 is fixed to the nipple 31 in a tying manner or in a hanging manner and the nipple 31 is connected to the main pipe 40, the flexible hose 30 is bent not to hinder other work.

Figure 2:
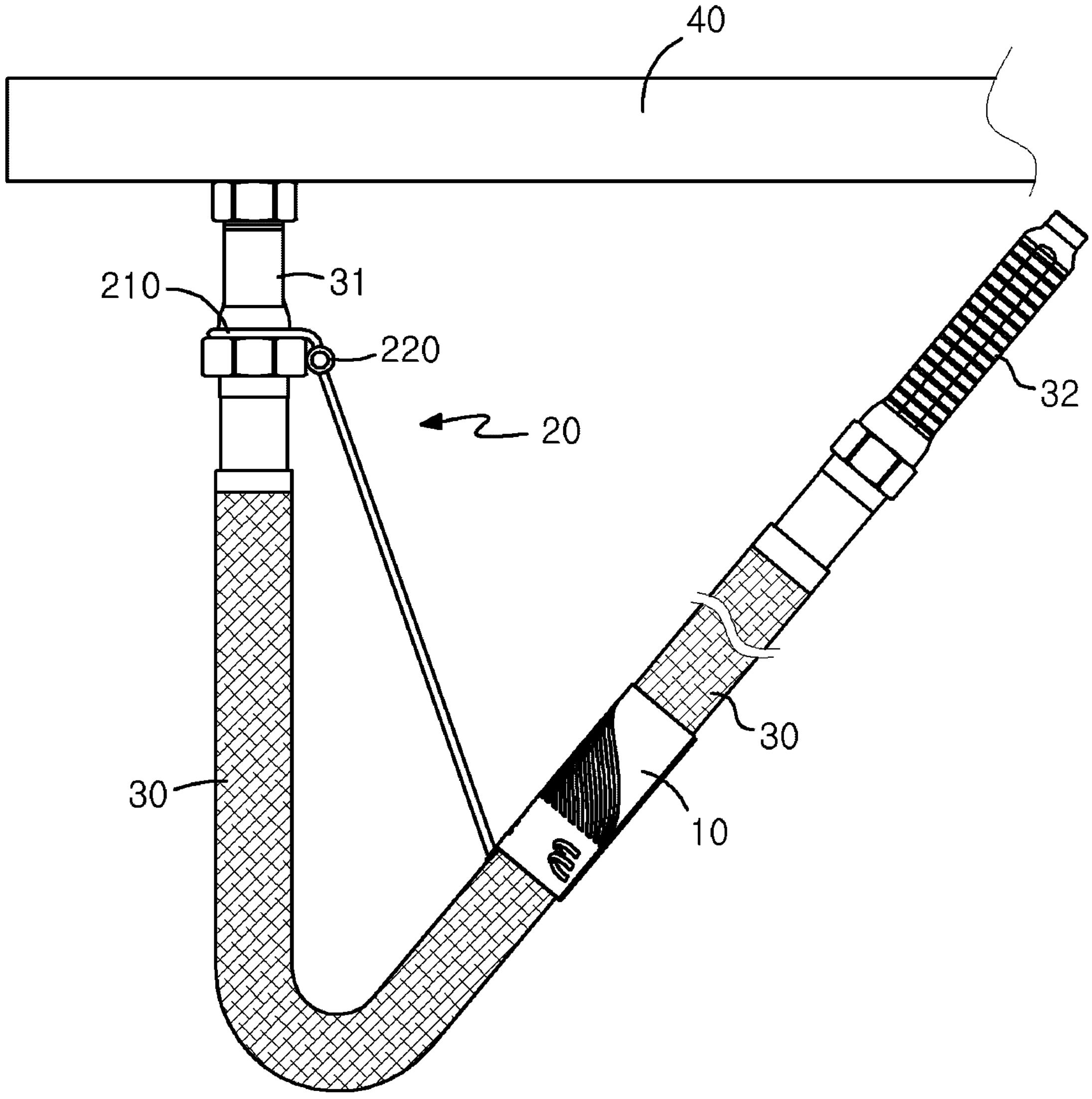
FIG. 2 is a view illustrating an example in which a flexible hose is suspended by using the present invention.

In the above state, when the bent flexible hose 30 is fit to the sleeve member 10 through the opening 11, as illustrated in FIG. 2, the bent state of the flexible hose 30 is maintained by the hanging means 20 and the sleeve member 10.

In the embodiments of FIGS. 5A and 5C, the nipple 31 can be connected to the flexible hose 30, which is the hanging means 20, after being connected to the main pipe 40, and then, the hanging means 20 can be connected to the flexible hose 30 after the sleeve member 10 holds the flexible hose 30.

Figure 3:
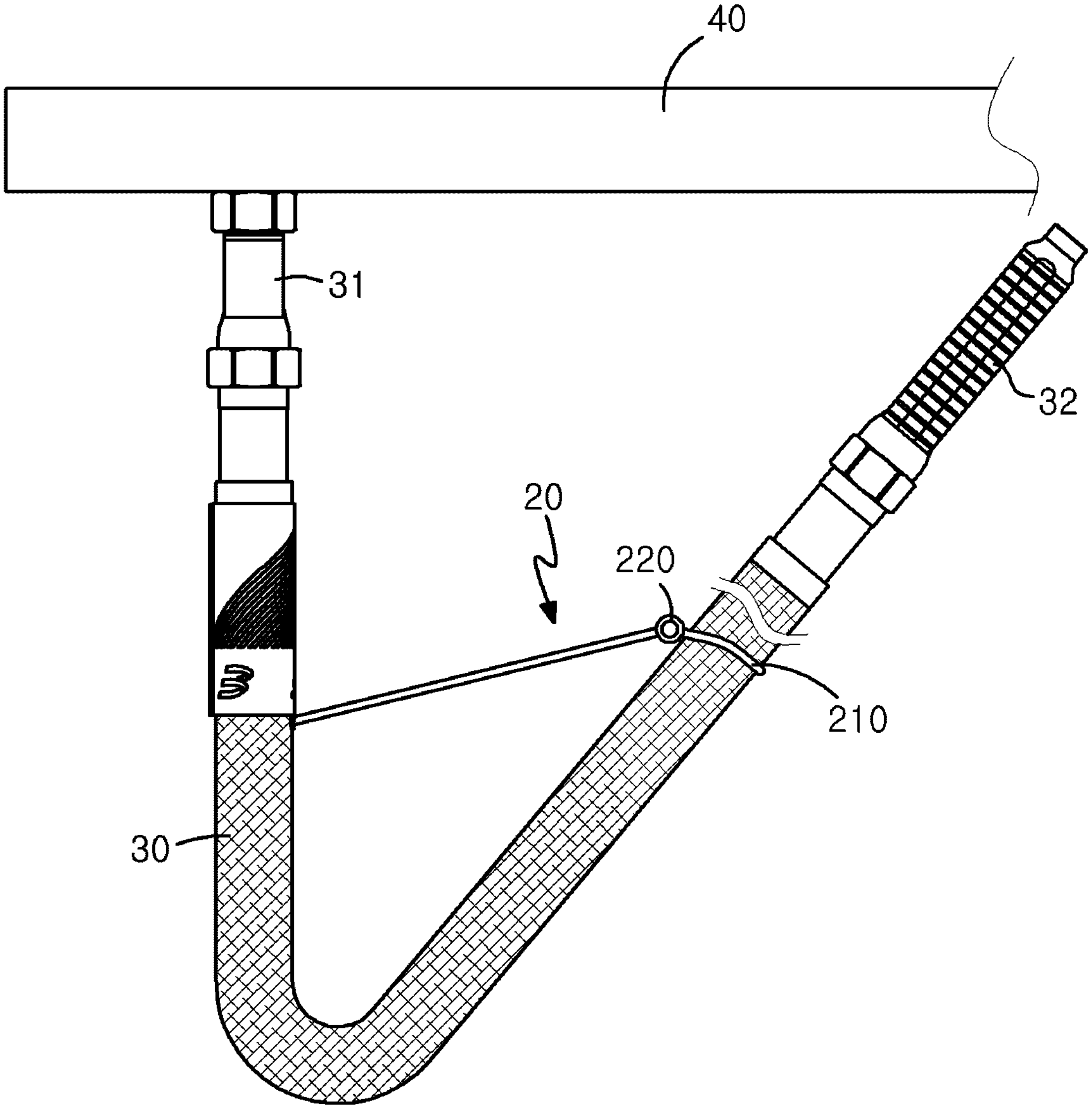
FIG. 3 is a view illustrating another example in which a flexible hose is suspended by using the present invention.

Unlike FIG. 2, FIG. 3 illustrates a state in which the hanging means 20 is mounted on the reducer 32 end and the sleeve member 10 is mounted on the nipple 31 end.

As illustrated in FIGS. 2 and 3, in the state in which the flexible hose 30 is hung by the sleeve member 10 and the hanging means 20, in a case in which ceiling facility work is performed, the flexible hose 30 does not hinder the work.

In order to install a sprinkler 50 after finishing the ceiling facility work, the sleeve member 10 is removed from the flexible hose 30 through the opening 11, and the flexible hose 30 is bent. Thereafter, the reducer 32 is mounted at a place where the sprinkler 50 will be mounted, and then, the sprinkler 50 is mounted on the reducer 32.

In a case in which the string of the hanging means 20 interferes with bending the flexible hose 30, the string 210 is cut or the ring 211 of the string 210 is removed from the flexible hose 30 so that the flexible hose 30 can be moved.

Figure 4:
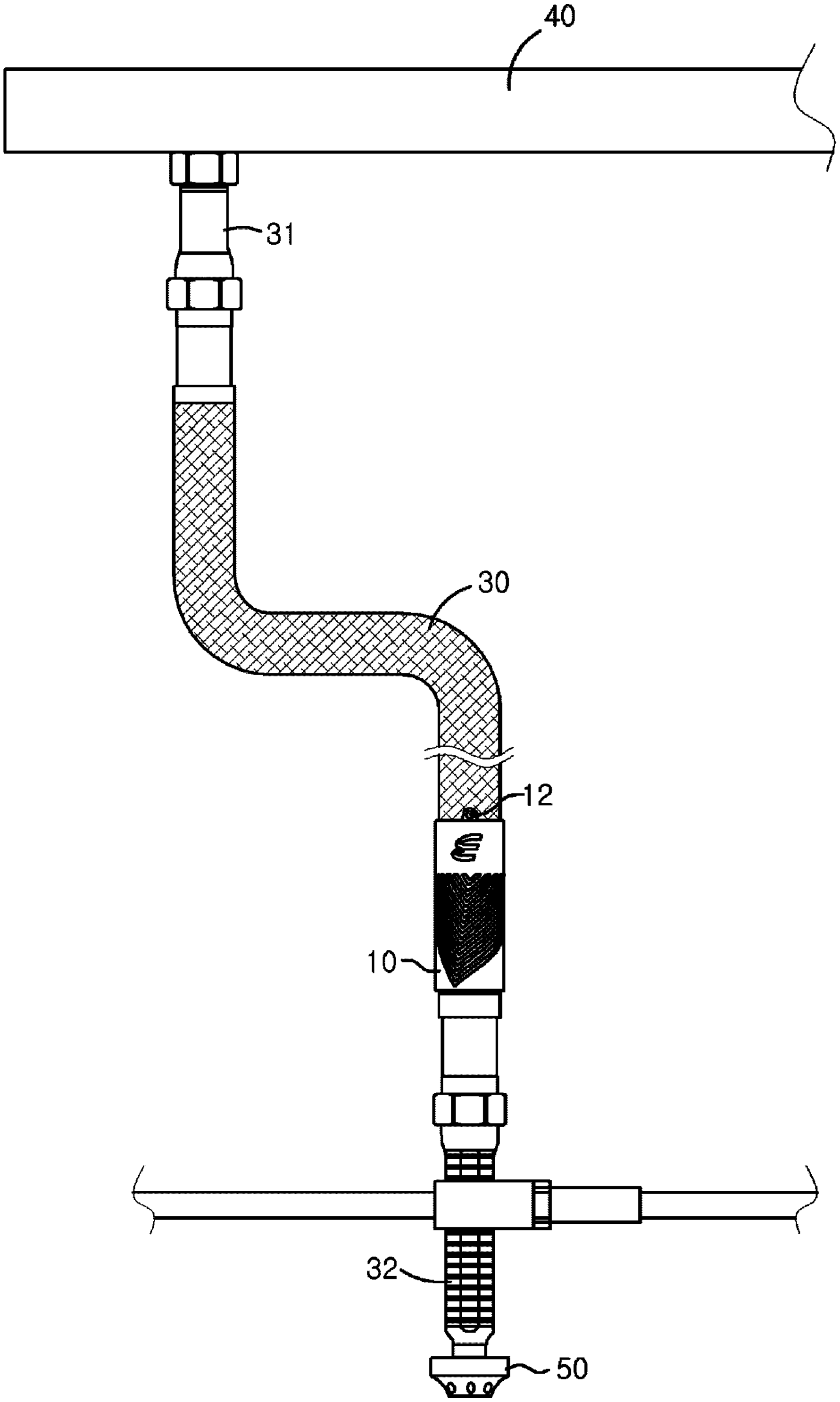
FIG. 4 illustrates a state in which a sprinkler is mounted on the flexible hose of the present invention to adjust a position of a sleeve member.
Figure 5:
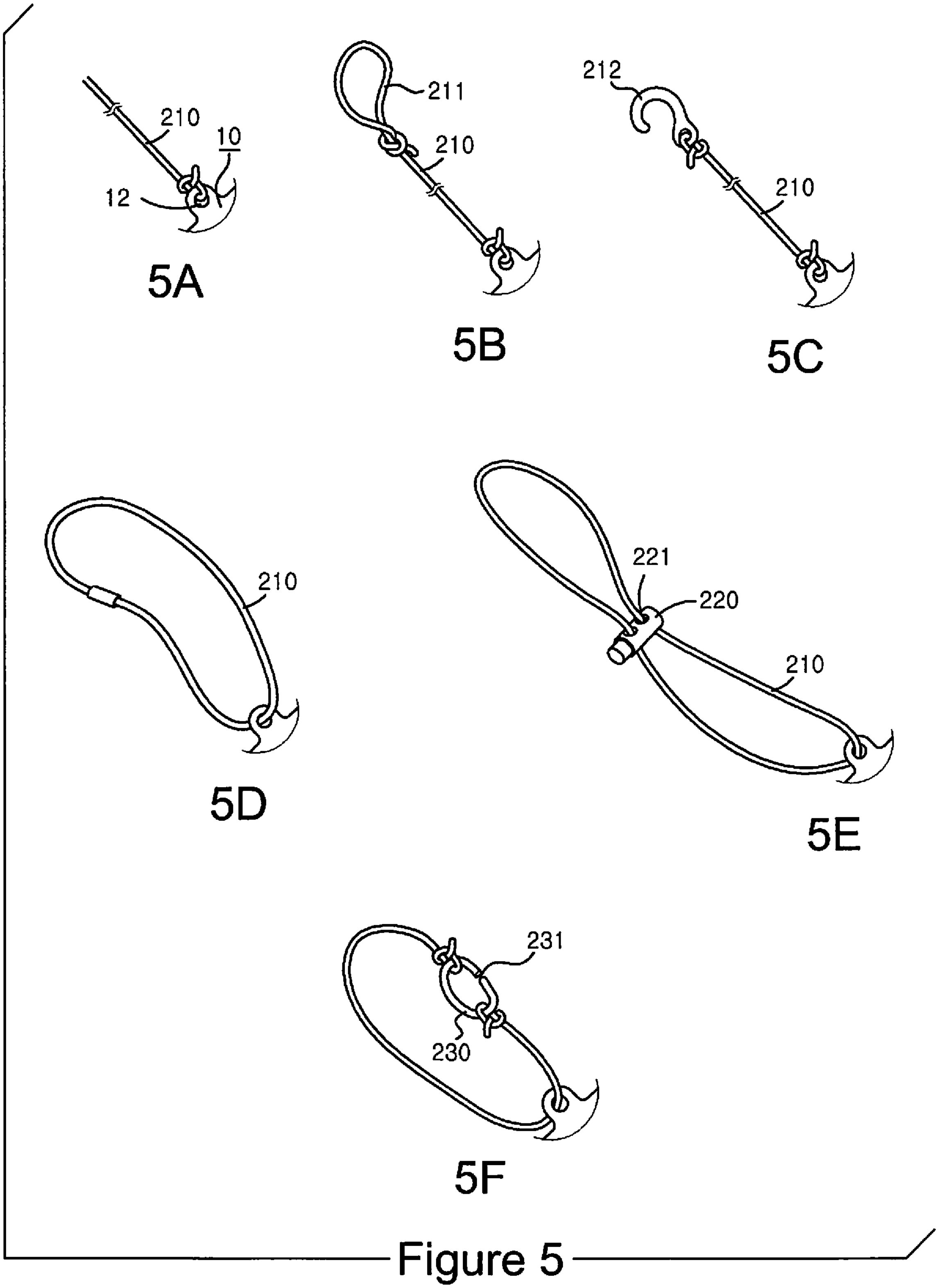
FIG. 5 consists of FIGS. 5A to 5F illustrating various examples of a hanging means of the present invention.

In the state in which the sprinkler 50 is mounted on the reducer 32, as illustrated in FIG. 4, when the opening 11 of the sleeve member 10 is fit close to the reducer 32 end, the sleeve member 10 serves as an identification sleeve to provide various information, such as whether the flexible hose 30 is a certified product suitable for firefighting, a manufacturer, a type and a direction of fluid, and the like.

As described above, the flexible hose identification sleeve for a sprinkler according to the present invention can allow a worker to effectively hang the flexible hose 30 by using the sleeve member 10 and the hanging means 20 regardless of positions of the main pipe 40 or other support members in the state in which the flexible hose of which one end is connected to the main pipe 40 is bent in the middle not to interfere with other work, thereby serving as a hanger.

Although the present invention has been described in detail with reference to the accompanying drawings, the present invention is not limited thereto, and various changes are possible without departing from the technical spirit of the present invention.

What is claimed is:

1. A flexible hose identification sleeve for a sprinkler comprising:

a sleeve member having a hole formed in one side and an opening formed on an outer face thereof and fitted to an outer diameter of a flexible hose; and a hanging device connected to the hole of the sleeve member for hanging the flexible hose which may be bent.

2. The flexible hose identification sleeve according to claim 1, wherein bent portions of the identification sleeve are formed on both sides of the opening formed on the outer face so as to be fit onto the flexible hose.

3. The flexible hose identification sleeve according to claim 1, wherein the hanging device is a string of which one end is tied to the hole.

4. The flexible hose identification sleeve according to claim 3, wherein a hanging member for hanging the flexible hose is connected to the other end of the string.

5. The flexible hose identification sleeve according to claim 3, wherein the string which is the hanging device is formed in a closed loop shape passing through the hole.

6. The flexible hose identification sleeve according to claim 5, wherein a tightening member having two through holes through which the string passes is provided.

7. The flexible hose identification sleeve according to claim 5, wherein the string is connected by a connection member having a detachable portion.

8. The flexible hose identification sleeve according to claim 3, wherein the string which is the hanging device is made of an elastic material.

* * * * *